US012677074B1

(12) United States Patent (10) Patent No.: US 12,677,074 B1
Koifman et al. (45) Date of Patent: Jul. 7, 2026

(54) LOW-POWER/SMALL-AREA PIXEL READOUT WITH RECIPROCAL RESPONSE

(71) Applicant: APPLE INC., Cupertino, CA (US)

(72) Inventors: Vladimir Koifman, Rishon Lezion (IL); Tiberiu Galambos, Binyamina (IL)

(73) Assignee: Apple Inc., Cupertino, CA (US)

( * ) Notice: Subject to any disclaimer, the term of this patent is extended or adjusted under 35 U.S.C. 154(b) by 114 days.

(21) Appl. No.: 18/759,156

(22) Filed: Jun. 28, 2024

Related U.S. Application Data

(60) Provisional application No. 63/579,515, filed on Aug. 30, 2023.

(51) Int. Cl.
H04N 25/60 (2023.01)
H04N 25/78 (2023.01)

(52) U.S. Cl.
CPC ............. H04N 25/60 (2023.01); H04N 25/78 (2023.01)

(58) Field of Classification Search
CPC ............................... H04N 25/60; H04N 25/78
See application file for complete search history.

(56) References Cited

U.S. PATENT DOCUMENTS

| | | | | |
|---|---|---|---|---|
| 2015/0015759 A1* | 1/2015 | Kayahan | ................ | H04N 25/77 |
| | | | | 348/308 |
| 2019/0347963 A1* | 11/2019 | Minagawa | ............. | H04N 25/79 |
| 2020/0084409 A1* | 3/2020 | Kobayashi | ............. | H04N 25/77 |
| 2022/0368843 A1* | 11/2022 | Chiba | .................. | H04N 25/709 |

FOREIGN PATENT DOCUMENTS

CN        104639166 B  *  2/2018   .............  H03M 1/12

* cited by examiner

*Primary Examiner* — Nhan T Tran
(74) *Attorney, Agent, or Firm* — Meitar Patents LTD.; Daniel Kligler

(57) ABSTRACT

An imaging device includes a pixel-circuit and a readout circuit. The pixel-circuit includes a photodetector configured to accumulate electrical charge in response to incident light and to transfer the electrical charge to a storage node. The readout circuit is configured to (i) charge a capacitance with a charge current that depends on the electrical charge in the storage node while comparing a voltage on the capacitance to a threshold, and (ii) generate an output signal indicative of a time duration needed to charge the capacitance until reaching the threshold, the time duration being inversely-related to the electrical charge accumulated by the photo-detector.

15 Claims, 7 Drawing Sheets

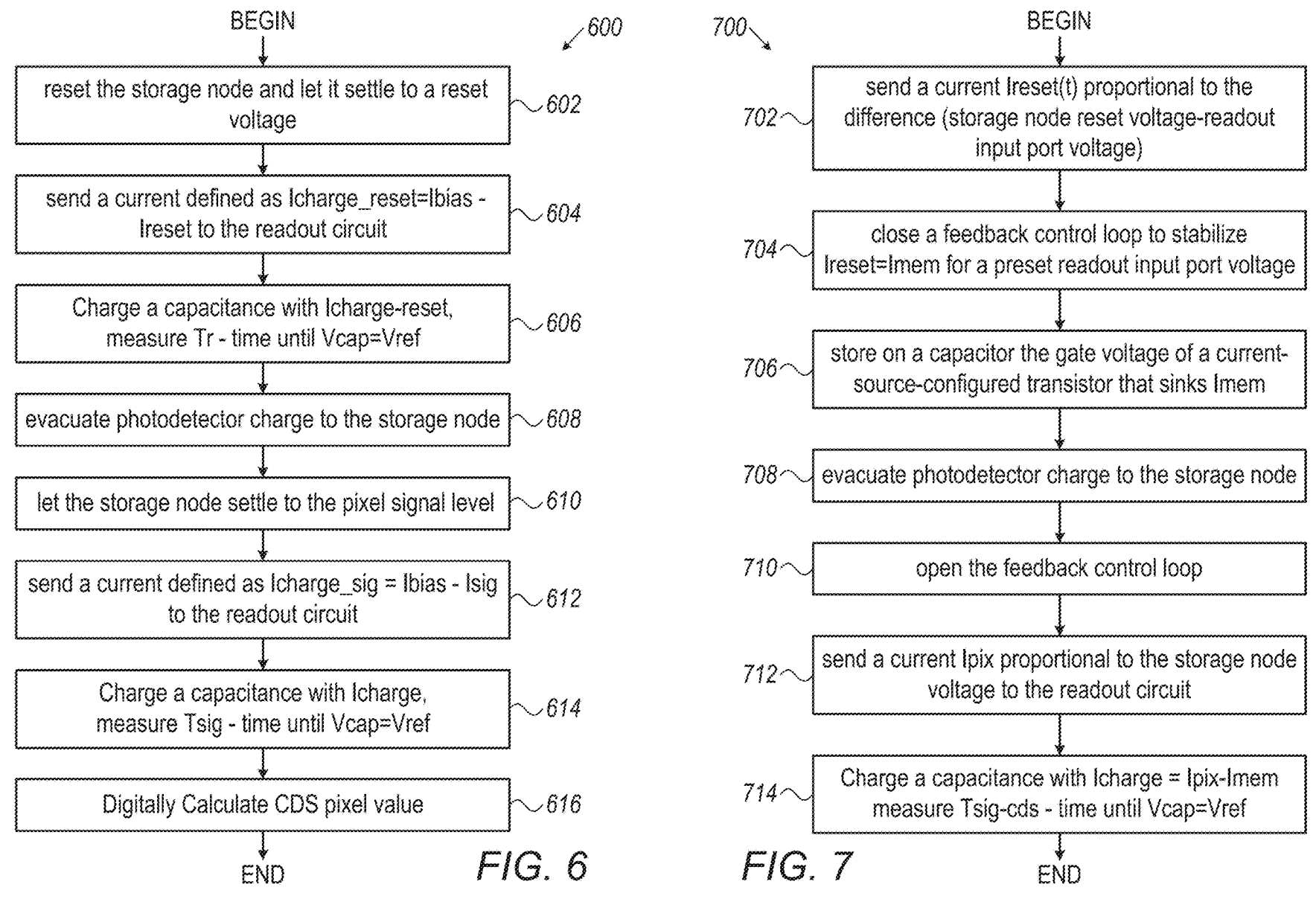

700 →

702 — send a current Ireset(t) proportional to the difference (storage node reset voltage-readout input port voltage)

704 — close a feedback control loop to stabilize Ireset=Imem for a preset readout input port voltage 706 — store on a capacitor the gate voltage of a current-source-configured transistor that sinks Imem 708 — evacuate photodetector charge to the storage node 710 — open the feedback control loop 712 — send a current Ipix proportional to the storage node voltage to the readout circuit 714 — Charge a capacitance with Icharge = Ipix-Imem measure Tsig-cds - time until Vcap=Vref

602 — reset the storage node and let it settle to a reset voltage

604 — send a current defined as Icharge_reset=Ibias - Ireset to the readout circuit 606 — Charge a capacitance with Icharge-reset, measure Tr - time until Vcap=Vref 608 — evacuate photodetector charge to the storage node 610 — let the storage node settle to the pixel signal level 612 — send a current defined as Icharge_sig = Ibias - Isig to the readout circuit 614 — Charge a capacitance with Icharge, measure Tsig - time until Vcap=Vref 616 — Digitally Calculate CDS pixel value

*FIG. 6*

LOW-POWER/SMALL-AREA PIXEL READOUT WITH RECIPROCAL RESPONSE

CROSS-REFERENCE TO RELATED APPLICATIONS

This application claims the benefit of U.S. Provisional Patent Application 63/579,515, filed Aug. 30, 2023, whose disclosure is incorporated herein by reference.

FIELD OF THE DISCLOSURE

The present disclosure relates generally to imaging devices, and particularly to pixel readout circuits of imaging devices.

BACKGROUND OF THE DISCLOSURE

Pixel noise in imaging devices having digital output may comprise quantization noise, fixed pattern noise, shot noise and others.

Some background may be found in U.S. Pat. No. 6,570,617, which discloses a single-chip camera including an integrated image acquisition portion and control portion and having double sampling/noise reduction capabilities thereon. Part of the integrated structure reduces the noise that is picked up during imaging.

In "CMOS image sensors: State-of-the-art", Albert J. P. Theuwissen, Solid-State Electronics 52 (2008) 1401-1406 (doi:10.1016), the author gives an overview of the (then) state-of-the-art of Complementary Metal-Oxide Semiconductor (CMOS) image sensors, focusing on the shrinkage of the pixels: the effect on the performance characteristics of the imagers and on the various physical parameters of the camera, how the CMOS pixel architecture is optimized to cope with the negative performance effects of the ever-shrinking pixel size which, on the other hand, allow further integration on column level and even on pixel level.

Lastly, in "Noise Characterization of CMOS Image Sensors", F. Sylvain et. al, 10th WSEAS CSCC conference, Volume: ISSN 1760-511, July 2006, the authors present noise characterization of a CMOS 0.6-µm image sensors system. The integrated readout circuit adaptability allows measuring the photocurrent magnitude of each pixel in charge integration mode or in transimpedance mode. In order to find the minimum detectable signal of this system and to identify the main dominant noise sources, an accurate noise analysis is performed under dark and illumination conditions.

SUMMARY OF THE DISCLOSURE

An embodiment that is described herein provides an imaging device including a pixel-circuit and a readout circuit. The pixel-circuit includes a photodetector configured to accumulate electrical charge in response to incident light and to transfer the electrical charge to a storage node. The readout circuit is configured to (i) charge a capacitance with a charge current that depends on the electrical charge in the storage node while comparing a voltage on the capacitance to a threshold, and (ii) generate an output signal indicative of a time duration needed to charge the capacitance until reaching the threshold, the time duration being inversely-related to the electrical charge accumulated by the photodetector.

In some embodiments, the readout circuit is configured to represent the output signal by a digital value. In an embodiment, a resolution of the digital value is set according to a maximum signal-to-noise ratio (SNR) that accounts for (i) the SNR of the output signal and (ii) quantization noise.

In a disclosed embodiment, the time duration needed to charge the capacitance is inversely-related to a difference between the electrical charge accumulated by the photodetector and a defined offset. In an embodiment, the pixel circuit is further configured to set the defined offset responsively to a reset charge.

In other embodiments, the imaging device further includes a column line that connects a group of pixel circuits to the readout circuit. In an embodiment, the pixel circuit includes an amplifier that is configured to drive a column line with a column-line voltage indicative of the electrical charge on the storage node. In a disclosed embodiment, the readout circuit is further configured to sink a column-line current from a column line, and to set the charge current that charges the capacitance depending on the sunk current.

There is additionally provided, in accordance with an embodiment that is described herein, a method for imaging including accumulating electrical charge by a photodetector in response to incident light, and transferring the electrical charge to a storage node. A capacitance is charged with a charge current that depends on the electrical charge in the storage node while a voltage on the capacitance is compared to a threshold. An output signal is generated. The output signal is indicative of a time duration needed to charge the capacitance until reaching the threshold, the time duration being inversely-related to the electrical charge accumulated by the photodetector.

The present invention will be more fully understood from the following detailed description of the embodiments thereof, taken together with the drawings in which:

BRIEF DESCRIPTION OF THE DRAWINGS

FIG. 6 is a flowchart that schematically illustrates a D-CDS method for converting incident light into pixel value, in accordance with an embodiment that is disclosed herein;

FIG. 7 is a flowchart that schematically illustrates an A-CDS method for converting incident light into pixel value, in accordance with an embodiment that is disclosed herein;

DETAILED DESCRIPTION OF EMBODIMENTS

Overview

Figure 1:
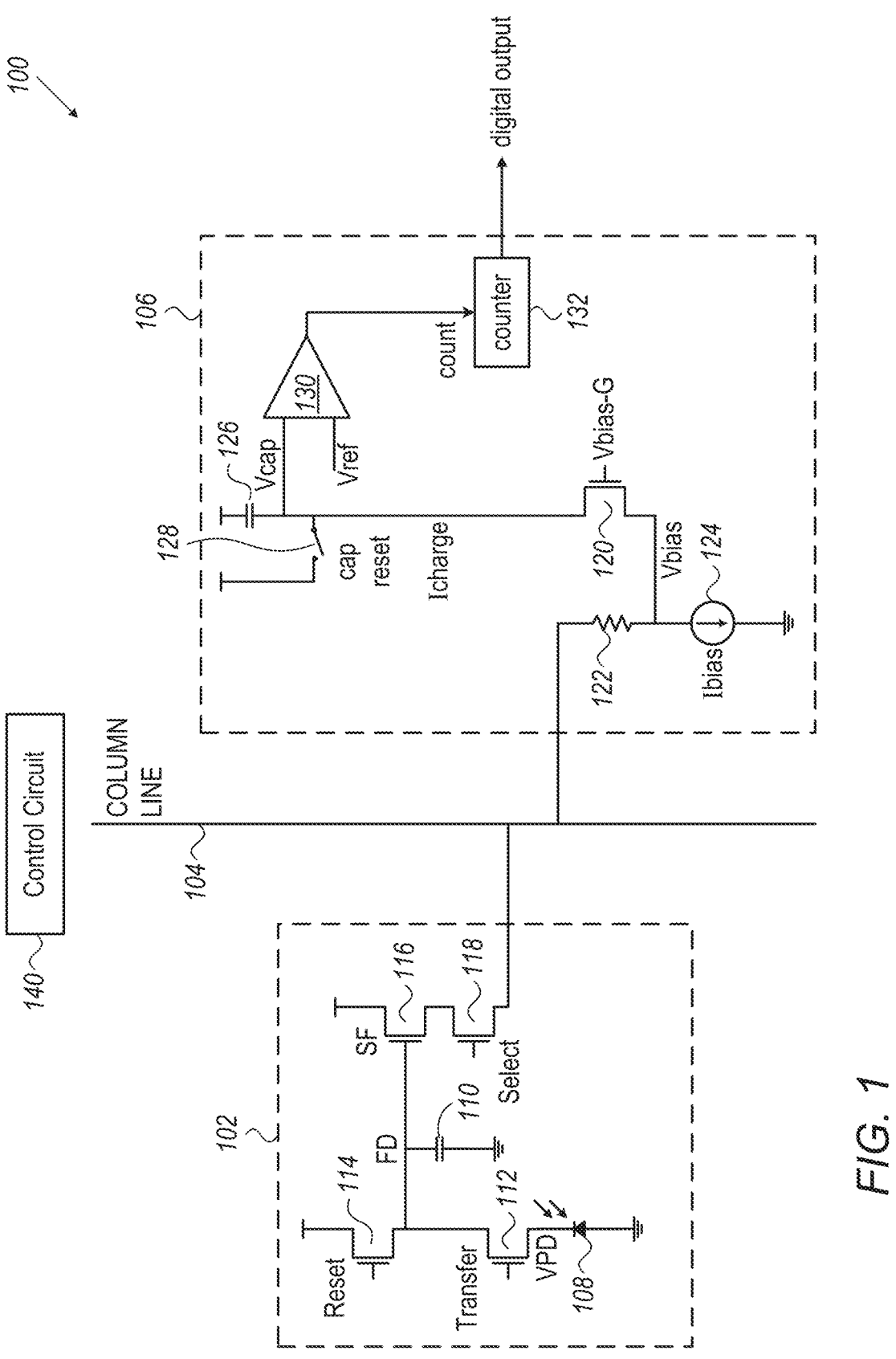
FIG. 1 is a block diagram that schematically illustrates a digital correlated-double-sampling (D-CDS) imaging device, in accordance with an embodiment that is disclosed herein.

Complementary Metal-Oxide Semiconductor (CMOS) imaging devices typically comprise pixel circuits, arranged in a matrix of rows and columns, and readout circuits. The pixel circuits include photodetectors that convert light into electrical charge and, typically, circuitry to transfer the charge to a storage node and to output a signal, responsively to the voltage on the storage node, to column lines.

The readout circuits are coupled to the column lines and convert the signals that the pixel circuits output into pixel values. Typically, the imaging device includes means to convert the pixel value into digital form.

When the pixel value is derived from a voltage on the storage node, an initial storage node voltage may hinder the readout accuracy. To mitigate, the initial voltage (typically referred to as reset voltage) may be subtracted from the readout voltage value. This technique is referred to herein as Correlated Double Sampling (CDS).

The output pixel value noise may comprise, for example, shot noise, thermal noise and quantization noise (possibly in addition to other noise sources, such as coupling between pixels, supply noise that propagates to the pixel, and many others). Signal to noise ratio (SNR) is smaller for low signal values and improves with stronger signal.

Embodiments that are disclosed herein present imaging devices featuring small area, low power dissipation and better SNR. In embodiments, the pixel circuit outputs a current responsively to a voltage on the storage node; the readout circuit charges a capacitor with a current according to the pixel-circuit output current and measures a time interval until the capacitor voltage reaches a preset threshold. Thus, the digital readout represents a value that is inversely related to the pixel value. This technique achieves a better trade-off between shot noise versus quantization noise, because when the pixel receives a strong light signal (and the shot noise is correspondingly high), the inversely related response has a coarser quantization. In low light conditions, on the other hand, the inversely related response provides finer quantization.

In some embodiments, the current that the pixel circuit sends to the readout circuit is determined by the voltage on the storage node, a gain of a buffer transistor, a voltage source at the input of the readout circuit and a resistor (typically attached to the column line). In embodiments, the storage node is at a storage-node reset voltage after reset and, after the accumulated charge is transferred from the photodetector to the storage node, at a storage-node pixel voltage. To achieve CDS, the pixel circuit first outputs a reset current according to the storage-node reset voltage and then outputs a pixel current according to the storage-node pixel voltage.

In an embodiment, Digital CDS (D-CDS) is used, wherein the readout circuit outputs a reset digital value and a pixel digital value, the reset digital value being inversely related to the reset current and the pixel digital value being inversely related to the pixel current. Then, in the digital domain, the reset and pixel voltages are extracted, and the pixel value is determined by subtracting the reset voltage from the pixel voltage.

In another embodiment, an Analog CDS (A-CDS) is used, wherein the readout circuit first forms a closed feedback loop to generate a current source that sinks the reset current (referred to as $I_{MEM}$ below), and then, when the pixel circuit outputs the pixel current, the readout circuit generates an output that is inversely related to the difference between the pixel current and the reset current.

Thus, in embodiments, a relatively simple readout circuit is used to build an improved SNR imaging device.

DESCRIPTION OF EMBODIMENTS

Embodiments that are disclosed herein describe image sensors comprising pixel circuits that convert incident light into voltage, and readout circuit that convert the pixel circuit's voltages into digital values. The digital values are inversely related to voltages on storage nodes within the imaging device (typically Floating Diffusion, or FD) and may comprise, in some embodiments, values that are inversely related to the storage node reset and pixel voltages, and, in other embodiment, values that are inversely related to the CDS-corrected pixel value.

We will describe hereinbelow embodiments comprising Digital-Correlated-Double-Sampling (D-CDS) imaging devices (with reference to FIGS. 1, 2 and 6), and embodiments comprising Analog-Correlated-Double-Sampling (A-CDS) imaging devices (with reference to FIGS. 3, 4 and 7).

FIG. 1 is a block diagram that schematically illustrates a digital-correlated-double-sampling (D-CDS) imaging device 100, in accordance with an embodiment that is described herein. Imaging device 100 comprises a pixel circuit 102 that is connected to a column line 104, and a readout circuit 106. In embodiments, imaging device 100 comprises a plurality of pixel circuits, arranged in a matrix, comprising intersecting rows and columns, a plurality of column lines (typically one for each column), and a plurality of readout circuits (one or more for each column).

Pixel circuit 102 comprises a Photodetector 108 that is configured to accumulate electrical charge in response to incident light. According to the example embodiment illustrated in FIG. 1, photodetector 108 comprises a pinned photo diode; other suitable types of photodetector may be used in alternative embodiments.

Pixel circuit 102 further comprises a Storage Node 110 (represented by a capacitor symbol), a Transfer Transistor 112, which is configured to transfer the charge accumulated on the photodetector to the storage node, a Reset Transistor 114, which is configured to reset the storage node (and, through the transfer transistor, clear the charge accumulated on the photodetector), a Source-Follower-configured transistor 116 (SF), which is configured to buffer the voltage on the storage node (SF transistor 116 will sometimes be referred to as Amplifier hereinbelow), and a Select Transistor 118, which is configured to drive the output of transistor 116 on column-line 104. A plurality of pixel circuits may be connected to a single column line; typically, at any given time, the SF transistor of only one pixel circuit in each column may be on, and, thus, a single pixel circuit in each column will drive the corresponding column line.

Storage-Node 110 is typically a floating diffusion (FD) and is so designated in FIG. 1 and in further figures in this application. Other types of storage nodes, however, may be used in alternative embodiments.

Column line 104 is connected to readout circuit 106. The readout circuit comprises a common gate connected transistor 120, which is configured to apply a $V_{bias}$ voltage on its drain (according to a voltage $V_{bias}$-G supplied to its gate), a resistor 122 having a resistance R, which is configured to conduct a current according to the difference between the column line voltage and the bias voltage, and a current source 124, which is configured to sink a preset bias current $I_{bias}$.

Common gate transistor 120, therefore, drains a current $I_{charge}$, which is equal to the difference between the current through resistor 122 and the bias current $I_{bias}$ through current source 124. $I_{charge}$ charges a capacitor 126 at a rate that is determined by the voltage on the column line, by the resistance R and by $V_{bias}$. In embodiments, $$I_{charge}=I_{bias}-(V_{column}-V_{bias})/R.$$

Capacitor 126 includes the parasitic capacitances of metal layers, diffusion areas, transistor gates etc.; in addition, in embodiments, one or more integrated capacitors may be added, for better capacitance control. Hence, capacitor 126 will sometimes be referred to as Capacitance 126.

A switch 128 (typically a P-channel Metal-Oxide Semiconductor (PMOS) transistor) is configured to discharge capacitance 126 before the charging begins. A comparator 130 is configured to compare the voltage on a terminal of capacitance 126 (designated $V_{CAP}$) to a preset threshold $V_{ref}$, and a counter 132 counts a time duration needed to charge the capacitance until reaching the threshold $V_{ref}$:

$$T=(V_{init}-V_{ref})*C/I_{charge}$$

where $V_{init}$ is the initial $V_{CAP}$ voltage (typically equal to the supply voltage).

Counter 132 is configured to count a clock input (not shown) during integration, when a Count input is high, indicating that $V_{CAP}$ is higher than $V_{ref}$ (the reset mechanism of counter 132 is not shown). Since $I_{charge}$ is linearly related to the voltage on the storage node, the output will also be inversely related to the storage node voltage and, hence, the lower light level pixels with lower SNR will map to a higher digital output value, where the SNR contribution of the quantization noise is smaller (a mathematical analysis will follow).

As will be shown below (with reference to FIG. 2), two digital output values may be generated—a first digital output corresponding to a reset voltage on the storage-node, and a second digital output corresponding to the voltage on the storage node after transfer transistor 112 transfers the accumulated charge from photodetector 108 to the storage node 110. The image sensor will subtract the first digital output from the second digital output, to implement a Digital Correlated Double Sampling (D-CDS).

Figure 2:
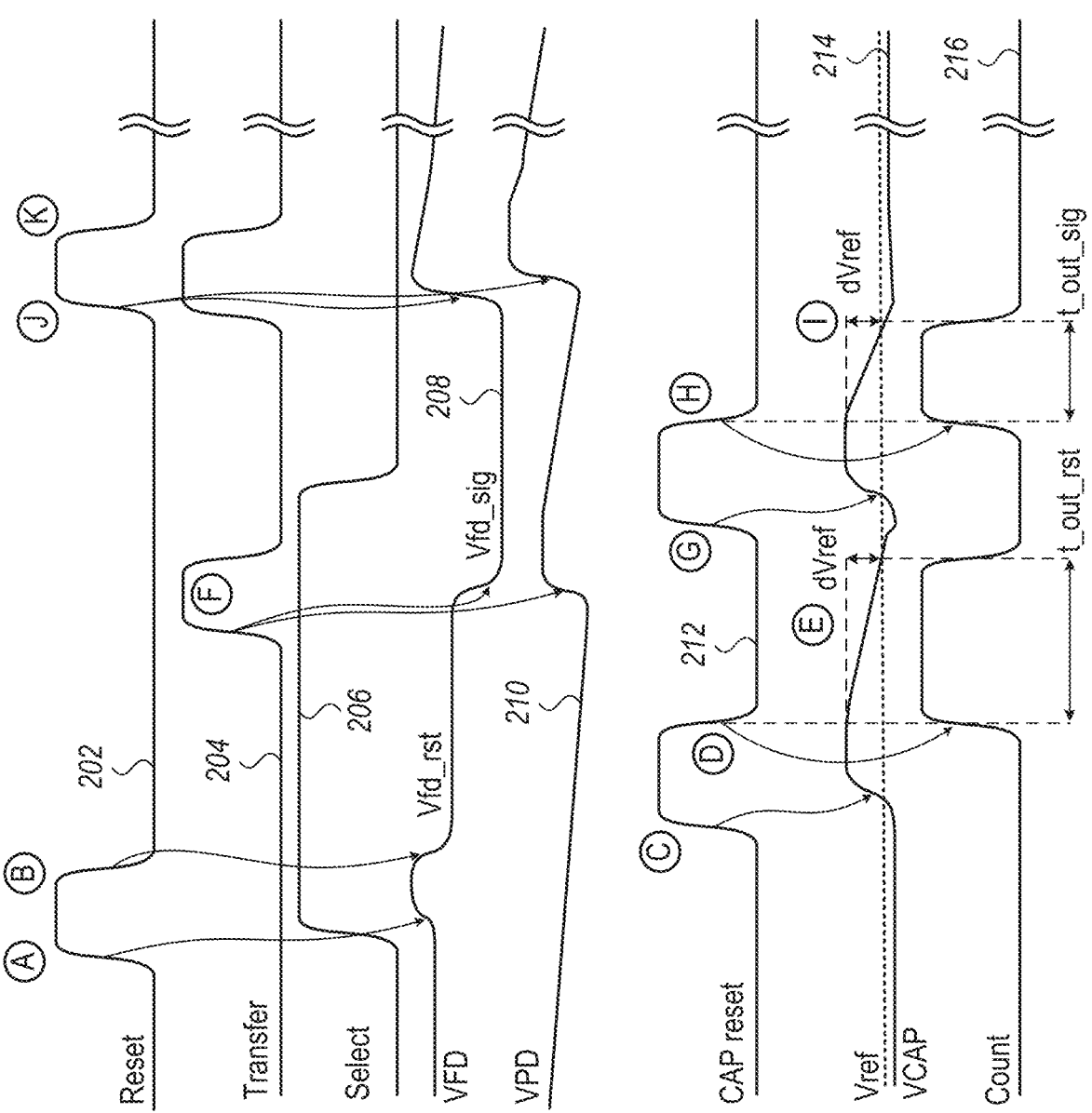
FIG. 2 is a timing diagram that schematically illustrates key signals of a D-CDS imaging device, in accordance with an embodiment that is disclosed herein.

Imaging device 100 further comprises a control Circuit 140, which is configured to control the pixel circuit and the readout circuit (e.g., by driving the gates of transistors 112, 114, 118, by controlling switch 128 and by applying a count input signal to counter 132. (Circuitry to reset counter 132 and/or to avoid reset until the counter is read is not shown. For example, in an embodiment, the counter is reset when the count input is inactive, and a latch latches the count at the end of the count signal.) FIG. 2 is a timing diagram 200 that schematically illustrates key signals of D-CDS imaging device 100, in accordance with an embodiment that is disclosed herein. All the illustrated signals refer to signals and devices in FIG. 1.

A Reset waveform 202 illustrates the signal applied to the gate of Reset transistor 114; a Transfer waveform 204 illustrates the signal applied to the gate of Transfer transistor 112; a Select waveform 206 illustrates the signal applied to the gate of Select transistor 118; a VFD waveform 208 illustrates the signal on storage node 110; a VPD waveform 210 illustrated the voltage on photodetector 108, a CAP-Reset waveform 212 illustrates the control of switch 128 (high is closed); a VCAP waveform 214 illustrates the voltage on capacitance 126 (at node $V_{CAP}$ in FIG. 1); and, an Count waveform 216 illustrates the Count signal output by Comparator 130. Major timepoints in timing diagram 200 are marked by circled letters, from A to K.

All waveforms start when the photodetector 108 accumulates charge responsively to incident light. VPD waveform 210 descends at a rate that depends on the light intensity.

At timepoint A, Control Circuit 140 (FIG. 1) applies a pulse at Reset signal 202, to pull VFD high (towards the positive supply), and set Select 206 on. At time point B, VFD falls to $V_{fd-rst}$ (floating-diffusion reset) due to the capacitive coupling between gate and source of reset transistor 114, the charge that leaves the channel of transistor 114 and the thermal noise component kT/C. The photodetector continues to accumulate charge, and VFD 208 keeps descending (until Transfer 204 is pulsed).

As Transfer 204 is off, $I_{charge}$, at this stage, will be set according to:

$$I_{charge}=I_{bias}-(V_{fd\text{-}rst}-V_{bias})/R.$$

At timepoint C, the control circuit pulses CAP-reset 212, to discharge capacitance 126, and the voltage VCAP 214 is set to the supply voltage. VPD 210 keeps descending.

At timepoint D, the pulse on CAP-reset 212 ends, capacitance 126 is charged (VCAP curve 214 slopes down) Count 216 turns high and, consequently, counter 132 starts counting. At timepoint E VCAP equals Vref, Count 216 turns low and the count stops, with the counter indicating a charge time inversely related to the voltage on the storage node during reset.

Next, at a timepoint F, the control circuit turns transfer transistor 112 (waveform 204) on to read the charge accumulated on the photodetector (the electrons that were accumulated due to incident light in the last exposure). The voltage on the photodetector (waveform 210) rises, and the voltage on the FD waveform 208 decreases accordingly, to a $V_{fd\_sig}$ level.

At timepoint G, the control circuit again pulses CAP-reset 212, to discharge capacitance 126, and the voltage VCAP 214 is set to the supply voltage. VFD 208 remains at $V_{fd\_sig}$ (until the next reset pulse).

At timepoint H the pulse on CAP-reset 212 ends, capacitance 126 is charged (VCAP curve 214 slopes down). Count 216 is high and counter 132 counts. At timepoint I VCAP equals Vref, Count 216 turns low and the count stops, with the counter indicating a charge time inversely related to the voltage on the storage node after the charge accumulated in the photodetector is evacuated thereto.

Next, starting at timepoint J and ending at timepoint K, the control circuit issues another Reset pulse (waveform 202) together with a pulse on transfer signal 204, to reset the photodiode and start the next light integration on the photodetector.

The two counter values—a reset value taken at timepoint E and a Signal value taken at timepoint I, can be used to calculate a Digital-Correlated-Double-Sampling (D-CDS) value of the pixel. The calculation is done in the digital domain, and involves transforming the inversely-related counter value to signal values and a subtraction operation.

The configuration of D-CDS imaging device 100 and the corresponding timing diagram 200 illustrated in FIGS. 1, 2 and described hereinabove are cited by way of example.

Other configurations may be used in alternative embodiments, including an Analog Correlated-Double-Sampling (A-CDS) configuration that will be described below. In some embodiments, pixel circuit 102 comprises more than one photodetector (and, accordingly, more than one transfer transistor). In embodiments, resistor 122 is shared by multiple readout circuits that are connected to a single column line; in an embodiment, both resistor 122 and current source 124 are shared.

Analog Versus Digital Correlated Double Sampling

In the embodiment described hereinabove, digital correlated double sampling (D-CDS) is done in the digital domain and requires calculations to extract the reset and signal values from the inversely related digital values read from counter 132 (FIG. 1). In some embodiments, the analog readout circuit is modified to perform analog correlated double sampling (A-CDS), improving the accuracy, and simplifying the calculation requirements in the digital domain.

Figure 3:
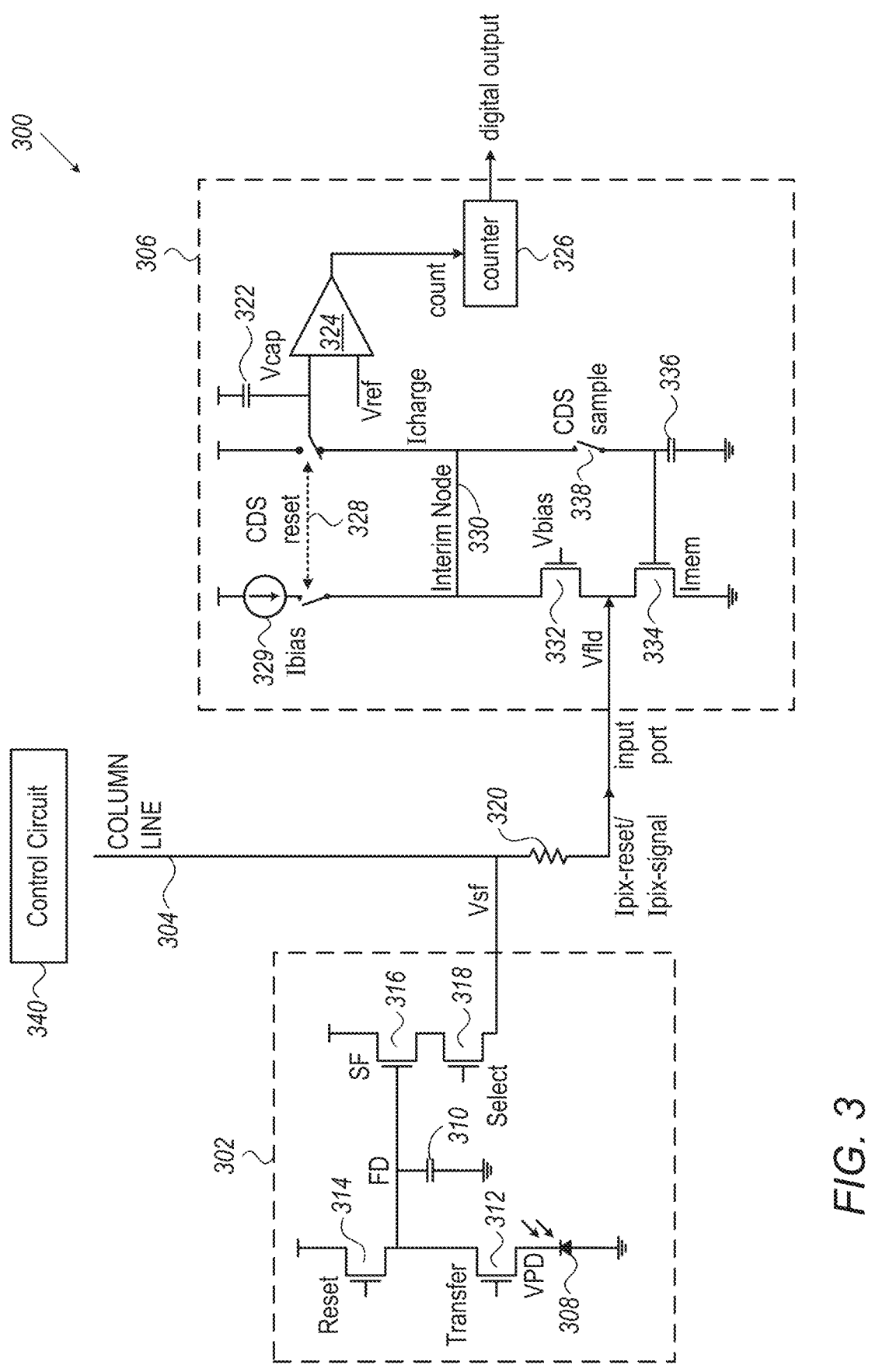
FIG. 3 is a block diagram that schematically illustrates an analog correlated-double-sampling (A-CDS) imaging device, in accordance with an embodiment that is disclosed herein.

FIG. 3 is a block diagram that schematically illustrates an analog-correlated-double-sampling (A-CDS) imaging device 300, in accordance with an embodiment that is disclosed herein. Like D-CDS imaging device 100 (FIG. 1), A-CDS imaging device 300 comprises a plurality of pixel circuits 302, arranged in a matrix, comprising intersecting rows and columns, a plurality of column lines 304, and a plurality of readout circuits 306.

Pixel circuit 302 may be identical to Pixel Circuit 102 (FIG. 1), and comprises a Photodetector 308 to accumulate electrical charge in response to incident light, a Storage Node 310 (e.g., an FD), a Transfer Transistor 312, to transfer the charge accumulated in the photodiode to the storage node, a Reset Transistor 314 to reset the storage node (and, through the transfer transistor, to clear the charge accumulated in the photodetector), an SF transistor 316, to buffer the voltage on the storage node (transistor 316 will sometimes be referred to as amplifier hereinbelow), and a Select Transistor 318, to drive the output of transistor 316 on column-line 304 (the voltage that Select Transistor 318 outputs is designated $V_{sf}$).

Column Line 304 is connected to the readout circuit through a resistor 320, which is configured to control the current that the pixel circuit sends according to the difference between $V_{sf}$ and the voltage at the input port of the readout circuit.

Readout circuit 306 comprises a capacitor 322 that is charged by a current $I_{charge}$, a comparator 324, configured to compare the voltage $V_{cap}$ on the capacitor terminal to a preset $V_{ref}$, and a counter 326 that counts a time duration needed to charge the capacitance to $V_{ref}$.

A CDS-reset input of the readout circuit controls a double-action CDS-Reset switch 328 (typically implemented by PMOS and/or N-channel Metal-Oxide Semiconductor (NMOS) transistors): in the inactive state, the switch connects an $I_{bias}$ current source 329 to an Interim Node 330, and connects $V_{CAP}$ to the positive supply, thus, discharging capacitor 322. In the active state, switch 328 connects $V_{CAP}$ to the Interim Node (capacitor 322 will now charge), and disconnects $I_{bias}$.

Readout circuit 306 further comprises an NMOS transistor 332, which is configured to set a voltage $V_{fld}$ on the input port according to a preset $V_{bias}$ that is applied to its gate, an NMOS transistor 334, which is configured to sink a current according to the voltage applied to its gate, a capacitor 336, which is configured to store a voltage that is applied to the gate of transistor 334, and a switch 338 (typically an NMOS transistor), which is configured to sample the voltage on Interim Node 330 in capacitor 336.

During CDS-reset, switch 328 is in the inactive state while CDS-sample switch 338 is on; capacitor 322 is discharged ($V_{CAP}$ is connected to the positive supply) and $I_{bias}$ source 329 is routed to the Interim Node 330. When switch 338 is on, the circuit comprising transistors 332, 334 and capacitor 336 is configured as a negative-feedback control loop, adjusting the voltage on capacitor 336 so that the current $I_{mem}$ through transistor 334 will be equal to the sum $I_{bias}+I_{pix-reset}$, where $I_{pix-reset}$ is the current that the pixel circuit sources responsively to a reset voltage on storage node 310. When switch 338 opens, capacitor 336 will retain its charge, so that transistor 334 will continue to sink $I_{mem}$.

When SF transistor 316 drives the column line, through select transistor 318, with a voltage according to the charge accumulated in the photodetector (during the exposure), the pixel circuit source $I_{pix-signal}$ to the readout circuit. Switch 328 is now set to the active state, disconnecting $I_{bias}$ current source 329 and connecting Interim Node 330 to Capacitor 322. Transistor 334 continues to sink current $I_{mem}$ (according to the reset voltage), and, hence, transistor 332 sinks a current that is equal to the difference between $I_{mem}$ and $I_{pixel-signal}$. Capacitor 322 will, therefore, discharge at a rate according to the CDS-corrected pixel charge, and counter 326 will output a digital value that is inversely related thereto.

Figure 4:
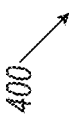
FIG. 4 is a timing diagram that schematically illustrates key signals of an A-CDS imaging device, in accordance with an embodiment that is disclosed herein.

FIG. 4 is a timing diagram 400 that schematically illustrates key signals of an A-CDS imaging device 300, in accordance with an embodiment that is disclosed herein. All the illustrated signals refer to signals and devices in FIG. 3.

A Reset waveform 402 illustrates the signal applied to the gate of Reset transistor 314; a Transfer waveform 404 illustrates the signal applied to the gate of Transfer transistor 312; a Select waveform 406 illustrates the signal applied to the gate of Select transistor 318; a VFD waveform 408 illustrates the signal on storage node 310; a VPD waveform 410 illustrates the voltage on photodetector 308, a CDS-Reset waveform 412 illustrates the control of CDS-Reset switch 328 (when CDS-Reset is high, $V_{CAP}$ is connected to $V_{dd}$, discharging the capacitor, and $I_{bias}$ 329 is connected to Interim Node 330); a CDS-Sample waveform 414 illustrates the control of switch 338 (connecting capacitor 336 to Interim Node 330 when high); An Imem waveform 416 illustrates the current through transistor 334, a VCAP waveform 418 illustrated the voltage on $V_{CAP}$; and, a Count waveform 420 illustrates the count input of counter 326. Major timepoints in timing diagram 400 are marked by circled letters, from A to I. All control signals are driven by Control Circuit 340.

Waveforms 402 through 420 start when the photodetector 308 accumulates charge responsively to incident light. VPD waveform 410 descends at a rate that depends on the light intensity. At timepoint A, Control Circuit 340 applies a pulse at Reset signal 402 to pull VFD high (towards the supply voltage), and turns Select 406 on. At time point B, VFD falls to $V_{fd-rst}$ (floating diffusion reset) due to the capacitive coupling between gate and source of reset transistor 314, the charge that leaves the channel of transistor 314 and the thermal noise component kT/C. The photodetector continues to accumulate charge, and VFD 408 keeps descending (until transfer 404 is pulsed).

At timepoint C, the control circuit pulses CDS-Reset, discharging capacitor 322 and connecting current source $I_{bias}$ 329 to Interim Node 330. At timepoint D, the control circuit connects the interim node to capacitor 336 and to the gate of transistor 334. As explained above, at this stage, a negative-feedback control loop will adjust the voltage on capacitor 336 so that the current $I_{mem}$ through transistor 334 will be equal to the sum $I_{bias}+I_{pix-reset}$. At timepoint E, the CDS-Reset pulse ends, and the capacitor voltage will remain unchanged, fixing the current $I_{mem}$ through transistor 334.

At timepoint F, the control circuit pulses the gate of Transfer transistor 312 (waveform 404), thus, evacuating the accumulated charge from photodetector 308 to storage node 310. The voltage VFD 408 declines to a level designated $V_{fd\text{-}sig}$; the photodetector voltage 410 rises and, when the Transfer pulse ends, the photodetector will, again, start to accumulate charge responsively to incident light.

At timepoint G, the pulse on CDS-reset 412 ends; the pixel circuit outputs $I_{pix\text{-}sig}$ that corresponds to the pixel signal voltage, and the charge current $I_{charge}$ will be set to $I_{mem}-I_{pix\text{-}sig}$, implementing correlated double sampling. Count is set high, and VCAP 418 charges at a rate according to $I_{mem}-I_{pix\text{-}sig}$. When, at timepoint H, $V_{CAP}=V_{ref}$, counter 326 stops counting; the counter value will be inversely related to the difference between $I_{pix}$ and $I_{reset}$.

From timepoint I to timepoint J, control circuit 340 pulses Reset 402 and Transfer 404, to reset the photodetector and start a new cycle.

The configuration of image sensor 300 and the corresponding timing diagram 400 illustrated in FIGS. 3, 4 and described hereinabove are cited by way of example. Other configurations may be used in alternative embodiments. In some embodiments, for example, pixel circuit 302 comprises more than one photodetector (and, accordingly, more than one transfer transistor). In embodiments, readout circuit 306 comprises a register rather than a counter; imaging device 300 comprises a global counter, and the readout circuit latch the value of the global counter when $V_{CAP}=V_{ref}$.

The configuration of A-CDS imaging device 300 and the corresponding waveforms 400 illustrated in FIGS. 2,4 and described hereinabove are cited by way of example. Other configurations and waveforms may be used in alternative embodiments. For example, in some embodiments, to minimize the noise component in the sampling of the voltage on capacitor 336 while using relatively small capacitors (resulting in smaller area), cascaded sampling on two or more capacitors are used. In some embodiments, the pixel circuit may comprise more than one photodetector and corresponding transfer gates; the waveforms in this case, change accordingly, to allow for the reset and signal sampling of multiple photodetectors.

Mathematical Representation of Signals

The following defines the values of signals in A-CDS imaging device 300 (FIG. 3).

When the feedback control loop converges, the current through transistor 334 is:

$$I_{mem}=I_{bias}+I_{pix\text{-}rst}=I_{bias}+(V_{fdrst}-V_{droprst}-V_{fld})/R_{sense}$$

where $V_{droprst}$ includes SF 316 gate-source voltage and the voltage drop on select transistor 318, and $V_{fld}$ is the voltage on the readout circuit input port (equal to the preset $V_{bias}$ minus the threshold voltage of transistor 332).

The capacitor charge current is:

$$I_{charge} = I_{mem} - I_{pixsig} =$$

$$I_{mem} - \frac{V_{fdrst} - \Delta Vsig * A_{sf} - V_{droprst} - V_{fld}}{R_{sense}} = I_{bias} + \frac{\Delta Vsig * A_{sf}}{R_{sense}}$$

where $\Delta V_{sig}=V_{fdrst}-V_{fdsig}$ and $A_{sf}$ is the gain of SF transistor 316.

The time during which counter 326 counts is given by:

$$t_{out} = \frac{C_{int} dV_{ref}}{I_{bias} + \frac{\Delta Vsig A_{sf}}{R_{sense}}}$$

where $C_{int}$ is the value of C 322 and $dV_{ref}$ is the voltage change on the capacitor, equal to $V_{dd}-V_{ref}$. The Count value output by Counter 326 is Fclk*tout, where Fclk is the frequency of the counter.

Light Response and Noise

The calculations of the light response and the noise components below will refer to exposure values that are measured by the number of electrons received on the storage node (e.g., Floating Diffusion, FD).

The storage node signal is:

$$\Delta Vsig = \frac{N_{photo} * q_e}{C_{fd}}$$

where $q_e$ is the charge of the electron and $C_{fd}$ is the capacitance of the storage node.

The shot noise component is then given by $n_{shot}=SQRT(N_{photo})$

The (non-linear) quantization step that corresponds to 1 clock cycle of the clock applied to counter 326 is:

$$ne_{LSB} = Cfd * \frac{DeltaVsig_{lsb}}{qe} = \frac{Cfd}{qe} * \frac{Tclk}{\frac{dtout}{dDeltaVsig}} = \frac{Cfd}{qe * fclk * \frac{dtout}{dDeltaVsig}}$$

The quantization noise is given by nq [e-rms]=ne_LSB/sqrt (12), assuming the probability distribution over the given digitization bin is uniform.

The derivative in this expression is:

$$\frac{dt_{out}}{d\Delta Vsig} = \frac{-C_{int} dV_{ref} \frac{A_{sf}}{R_{sense}}}{\left(I_{bias} + \frac{\Delta Vsig A_{sf}}{R_{sense}}\right)^2}$$

Performance Graphs

We will now proceed to describe the performance graphs of imaging device 300, according to an embodiment.

Twenty-five photodetector charge accumulation values ("Nphoto") were considered, from 1 to 100,000 (electrons), with a ratio of sqrt(10) between successive values.

Figure 5:
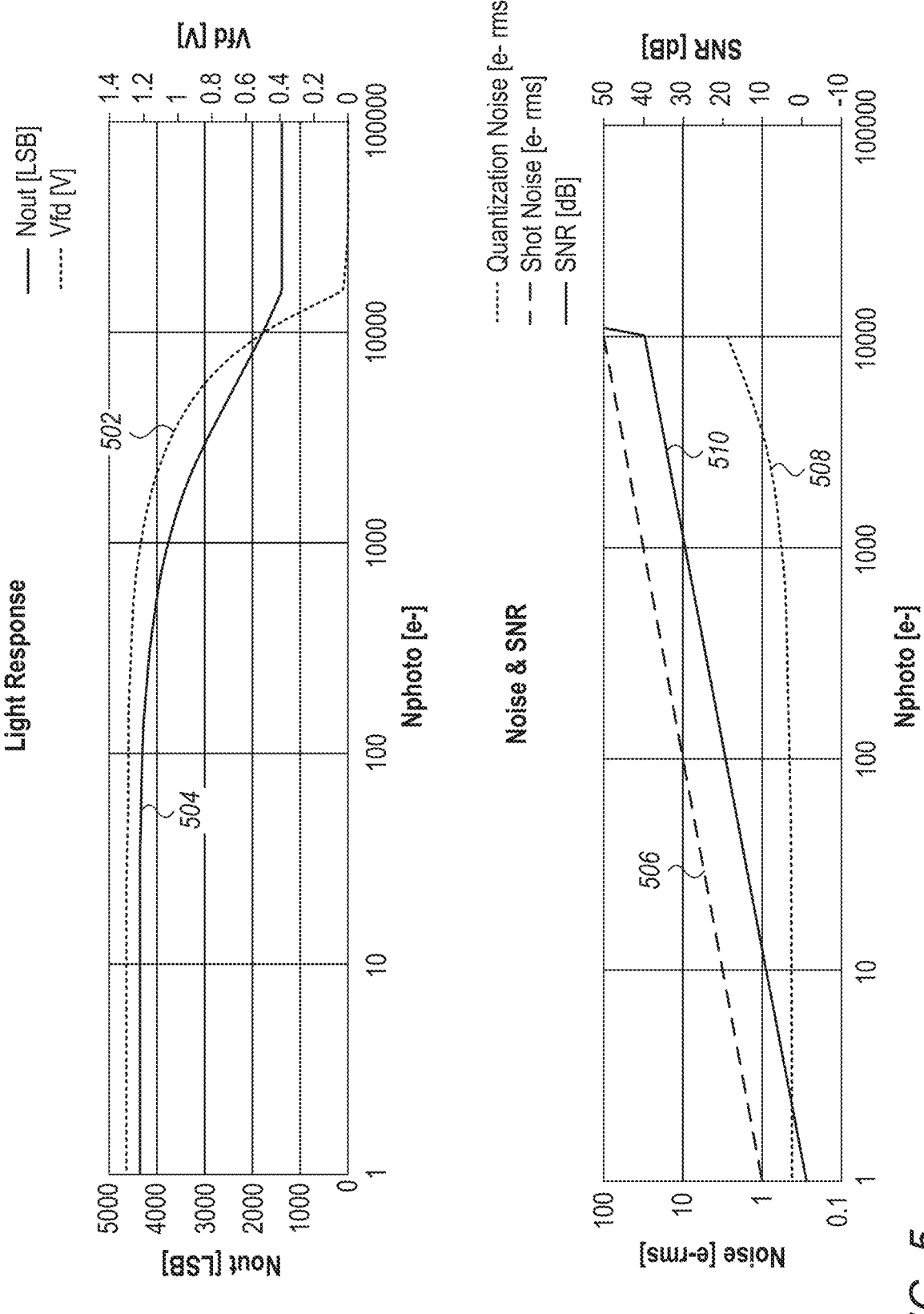
FIG. 5 is a graph that schematically Illustrates five performance parameters of an imaging device as a function of the number of electrons accumulated in the photodetector, in accordance with an embodiment that is disclosed herein.

FIG. 5 is a graph 500 that schematically Illustrates five performance parameters of an imaging device as a function of the number of electrons accumulated in the photodetector, in accordance with an embodiment that is disclosed herein.

A graph 502 illustrates the digital output Nout as a function of the number of accumulated electrons. Nout reaches a maximum value of 3972 (and, hence, the pixel values may be represented by 12-bit numbers).

A graph 504 illustrates $V_{fd}$—the voltage on the storage node (FD 310) as a function of the number of accumulated electrons. The storage node voltage starts at approximately 1.3V when there is no light (note that $V_{fd}$ can never be negative).

A graph 506 illustrates the shot noise ($N_{shot}$); a graph 508 illustrates the quantization noise ($N_q$), and a graph 510 illustrates the SNR.

The calculations of the five performance parameters were described hereinabove.

FIG. 6 is a flowchart 600 that schematically illustrates a D-CDS method for converting incident light to pixel value, in accordance with an embodiment that is disclosed herein. The method is executed by control circuit 140 and by other components of D-CDS imaging device 100 (FIG. 1). The last stage is typically executed in the digital domain, by a suitable processor (not shown in FIG. 1).

The flowchart starts at a Reset operation 602, wherein the control circuit resets storage node 110 and lets it settle to a reset voltage, then activates SF transistor 116 and Select transistor 118, so that a current $I_{reset}$ related to the difference between the storage node reset voltage and a preset bias voltage will flow from pixel circuit 102 to readout circuit 106.

Next, at an Send Reset Current operation 604, a bias current $I_{bias}$ is added to $I_{reset}$; the sum, $I_{charge\text{-}reset}=I_{bias}-I_{reset}$ is routed to a pre-reset capacitor.

At a Charge-Capacitor-and-Measure-Reset-Time operation 606, $I_{charge\text{-}reset}$ charges a pre-reset capacitor; a comparator (130) and a counter (132) measure the time $T_r$ until the voltage on the capacitor reaches a preset threshold. The value $T_r$ is stored in digital memory. It should be noted that the digital value is inversely related to the storage node reset voltage.

Now that the reset value has been stored, the accumulated charge in the photodiode is evaluated. At an Evacuate Photodetector Charge operation 608, the control circuit activates transfer transistor 112, to transfer all charge from the photodetector to the storage node. Next, at a Settle Storage Node tp Pixel Signal Level operation 610, the control circuit activates SF transistor 116 and Select transistor 118, so that the storage node level will settle to the pixel signal level (after charge transfer is complete.

Then, at a Send Signal Current operation 612, a bias current $I_{bias}$ is added to $I_{pix}$; the sum, $I_{charge\text{-}sig}=I_{bias}-I_{sig}$ is routed to capacitor 126.

Next, at a Charge-Capacitor-and-Measure-Pixel-Time operation 614, $I_{charge\text{-}pix}$ charges the capacitor (which is preset prior to operation 614); the comparator and the counter measure the time Tp until the voltage on the capacitor reaches a preset threshold. The value Tp, which is inversely related to the storage node pixel voltage stored in digital memory.

Lastly, at a Calculate-CDS operation 616, the reset value $V_r$ is extracted from $T_r$, the pixel value $V_p$ is extracted from $T_p$, and the CDS pixel value $V_{pix\text{-}CDS}=V_p-V_r$ is output. The mathematical operations described above are executed in the digital domain, typically by a processor, and involve division operations.

FIG. 7 is a flowchart 700 that schematically illustrates an A-CDS method for converting incident light to pixel value, in accordance with an embodiment that is disclosed herein. The method is executed by control circuit 340 and by other components of A-CDS imaging device 300 (FIG. 3).

The flowchart starts at a Send-$I_{reset}$ operation 702, wherein the control circuit resets storage node 310 and then activates SF transistor 316 and Select transistor 318. The readout circuit 306 forces a preset voltage $V_{fld}$ at the readout circuit input port, so that a current $I_{reset}$ related to the difference between the voltage at the output of the pixel circuit $V_{sf}$ and the voltage at the readout circuit input port $V_{fld}$ will flow from the pixel circuit to the readout circuit.

Then, at a Close-Control-Feedback-Loop operation 704, the control circuit forms a negative feedback control loop in the readout circuit, wherein the voltage at the gate of a sink transistor (334) is set so as to force a sink current $I_{MEM}=I_{reset}+I_{bias}$. The gate voltage is then, at a Store-Gate-Voltage operation 706, stored on a capacitor, so that the sink transistor will continue to sink $I_{MEM}$ at further stages.

Next, at an Evacuate Photodetector Charge operation 708, the control circuit activates transfer transistor 312, to transfer all the charge (electrons) accumulated on the photodetector responsively to incident light, to storage node 310. Then at an Open-Control-Feedback-Loop operation 710, the control feedback loop is opened and $I_{bias}$ current source is disconnected.

Now, at a Send-$I_{pix}$ operation 712, the control circuit activates SF transistor 316 and Select transistor 318; the readout circuit forces the preset voltage $V_{fld}$ at the readout circuit input port, so that a current $I_{pix}$ related to the difference between the voltage at the output of the pixel circuit $V_{sf}$ and the voltage at the readout circuit input port $V_{fld}$ will flow from the pixel circuit to the readout circuit.

Lastly, at a Charge-Capacitor-and-Measure-Time operation 714, a current $I_{charge}=I_{MEM}-I_{pix}$ charges the integration capacitor 322 (which is pre-reset), and the time until the voltage on the capacitor reaches a preset threshold Vref is measured, to get a digital value that is related to the CDS-corrected pixel value.

Although the embodiments described herein mainly address imaging devices with reciprocal response, the techniques described herein can also be used in other applications, such as in other sensor applications that would benefit from a non-uniform quantization ADC. Moreover, the techniques may be used in various systems that measure a flux of discrete entities (particle flux or similar) that are modeled by a Poisson distribution.

Figure 8:
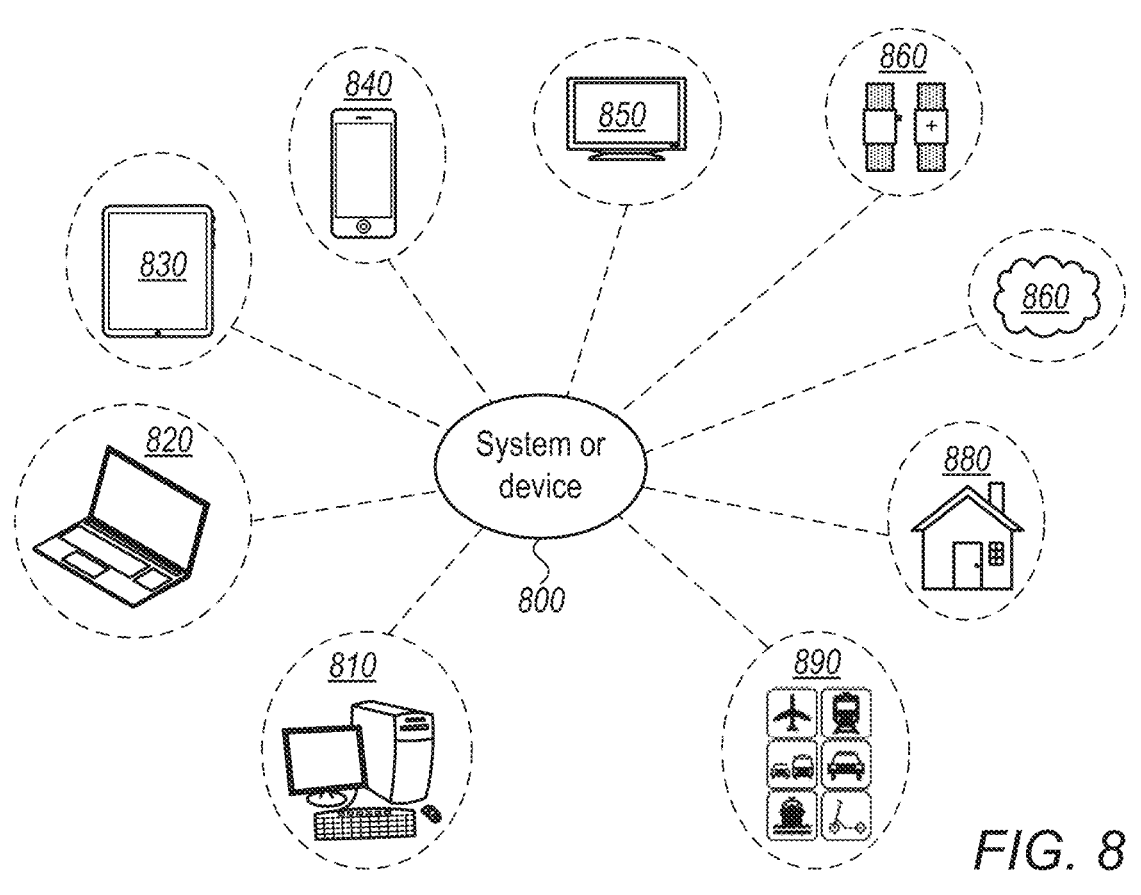
FIG. 8 is a diagram that schematically illustrates various types of systems that may include any of the circuits, devices, or system discussed above, in accordance with embodiments that are described herein.

FIG. 8 is a diagram 800 that schematically illustrates various types of systems that may include any of the circuits, devices, or system discussed above, in accordance with embodiments that are described herein. System or device 800, which may incorporate or otherwise utilize one or more of the techniques described herein, may be utilized in a wide range of areas. For example, system or device 800 may be utilized as part of the hardware of systems such as a desktop computer 810, laptop computer 820, tablet computer 830, cellular or mobile phone 840, or television 850 (or set-top box coupled to a television).

Similarly, disclosed elements may be utilized in a wearable device 860, such as a smartwatch or a health-monitoring device. Smartwatches, in many embodiments, may implement a variety of different functions, for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 800 may also be used in various other contexts. For example, system or device 800 may be utilized in the context of a server computer system, such as a dedicated server or on shared hardware that implements a cloud-based service 870. Still further, system or device 800 may be implemented in a wide range of specialized every-day devices, including devices 880 commonly found in the home such as refrigerators, thermostats, security cameras, etc. The interconnection of such devices is often referred to as the "Internet of Things" (IoT). Elements may also be implemented in various modes of transportation. For example, system or device 800 could be employed in the control systems, guidance systems, entertainment systems, etc. of various types of vehicles 890.

The applications illustrated in FIG. 8 are merely exemplary and are not intended to limit the potential future applications of disclosed systems or devices. Other example applications include, without limitation: portable gaming devices, music players, data storage devices, unmanned aerial vehicles, etc.

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 9:
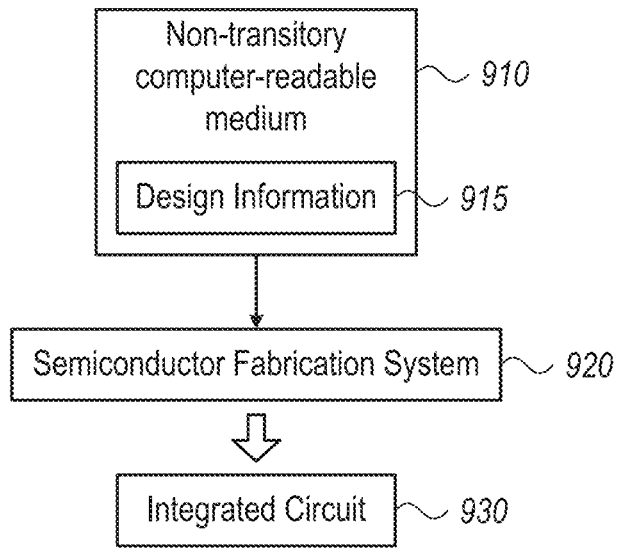
FIG. 9 is a block diagram illustrating an example non-transitory computer-readable storage medium that stores circuit design information, according to some embodiments that are described herein.

FIG. 9 is a block diagram illustrating an example non-transitory computer-readable storage medium that stores circuit design information, according to some embodiments that are described herein. In the illustrated embodiment semiconductor fabrication system 920 is configured to process the design information 915 stored on non-transitory computer-readable medium 910 and fabricate integrated circuit 930 based on the design information 915.

Non-transitory computer-readable storage medium 910, may include any of various appropriate types of memory devices or storage devices. Non-transitory computer-readable storage medium 910 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 910 may include other types of non-transitory memory as well or combinations thereof. Non-transitory computer-readable storage medium 910 may include two or more memory mediums which may reside in different locations, e.g., in different computer systems that are connected over a network.

Design information 915 may be specified using any of various appropriate computer languages, including hardware description languages such as, without limitation: VHDL, Verilog, SystemC, SystemVerilog, RHDL, M, MyHDL, etc. Design information 915 may be usable by semiconductor fabrication system 920 to fabricate at least a portion of integrated circuit 930. The format of design information 915 may be recognized by at least one semiconductor fabrication system 920. In some embodiments, design information 915 may also include one or more cell libraries which specify the synthesis, layout, or both of integrated circuit 930. In some embodiments, the design information is specified in whole or in part in the form of a netlist that specifies cell library elements and their connectivity. Design information 915, taken alone, may or may not include sufficient information for fabrication of a corresponding integrated circuit. For example, design information 915 may specify the circuit elements to be fabricated but not their physical layout. In this case, design information 915 may need to be combined with layout information to actually fabricate the specified circuitry.

Integrated circuit 930 may, in various embodiments, include one or more custom macrocells, such as memories, analog or mixed-signal circuits, and the like. In such cases, design information 915 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 is configured to operate according to a circuit design specified by design information 915, which may include performing any of the functionality described herein. For example, integrated circuit 930 may include any of various elements shown in FIGS. 1 through 9. Further, integrated circuit 930 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

\*\*\*

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C.

This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

***

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

The invention claimed is:

1. An imaging device, comprising:
   a pixel-circuit, comprising a photodetector configured to accumulate electrical charge in response to incident light and to transfer the electrical charge to a storage node; and
   a readout circuit, configured to:
      charge a capacitance with a charge current that depends on the electrical charge in the storage node while comparing a voltage on the capacitance to a threshold; and
      generate an output signal indicative of a time duration needed to charge the capacitance until reaching the threshold, the time duration being inversely-related to the electrical charge accumulated by the photodetector.

2. The imaging device according to claim 1, wherein the readout circuit is configured to represent the output signal by a digital value.

3. The imaging device according to claim 2, wherein a resolution of the digital value is set according to a maximum signal-to-noise ratio (SNR) that accounts for (i) the SNR of the output signal and (ii) quantization noise.

4. The imaging device according to claim 1, wherein the time duration needed to charge the capacitance is inversely-related to a difference between the electrical charge accumulated by the photodetector and a defined offset.

5. The imaging device according to claim 4, wherein the pixel circuit is further configured to set the defined offset responsively to a reset charge.

6. The imaging device according to claim 1, further comprising a column line that connects a group of pixel circuits to the readout circuit.

7. The imaging device according to claim 1, wherein the pixel circuit comprises an amplifier that is configured to drive a column line with a column-line voltage indicative of the electrical charge on the storage node.

8. The imaging device according to claim 1, wherein the readout circuit is further configured to sink a column-line current from a column line, and to set the charge current that charges the capacitance depending on the sunk current.

9. A method for imaging, comprising:
   accumulating electrical charge by a photodetector in response to incident light, and transferring the electrical charge to a storage node;
   charging a capacitance with a charge current that depends on the electrical charge in the storage node while comparing a voltage on the capacitance to a threshold; and
   generating an output signal indicative of a time duration needed to charge the capacitance until reaching the threshold, the time duration being inversely-related to the electrical charge accumulated by the photodetector.

10. The method according to claim 9, further comprising representing the output signal by a digital value.

11. The method according to claim 10, wherein a resolution of the digital value is set according to a maximum signal-to-noise ratio (SNR) that accounts for (i) the SNR of the output signal and (ii) quantization noise.

12. The method according to claim 9, wherein the time duration needed to charge the capacitance is inversely-related to a difference between the electrical charge accumulated by the photodetector and a defined offset.

13. The method according to claim 12, further comprising setting the defined offset responsively to a reset charge.

14. The method according to claim 9, further comprising, using an amplifier, driving a column line with a column-line voltage indicative of the electrical charge on the storage node.

15. The method according to claim 9, further comprising sinking a column-line current from a column line, and setting the charge current that charges the capacitance depending on the sunk current.

* * * * *